(12) United States Patent
Tomishige et al.

(10) Patent No.: US 7,912,697 B2
(45) Date of Patent: Mar. 22, 2011

(54) CHARACTER INPUTTING METHOD AND CHARACTER INPUTTING APPARATUS

(75) Inventors: Kaoru Tomishige, Nara (JP); Yoshihiro Okuda, Nara (JP); Chiaki Yasumura, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1617 days.

(21) Appl. No.: 10/989,338

(22) Filed: Nov. 17, 2004

(65) Prior Publication Data

US 2005/0114138 A1 May 26, 2005

(30) Foreign Application Priority Data

Nov. 20, 2003 (JP) .............................. P2003-391041

(51) Int. Cl.
*G06F 17/20* (2006.01)
*G10L 21/00* (2006.01)
*G06F 17/28* (2006.01)
*G06F 3/048* (2006.01)
*G06F 3/00* (2006.01)

(52) U.S. Cl. ............ 704/8; 455/566; 455/425; 715/264; 715/262; 704/3; 704/7; 704/270

(58) Field of Classification Search ............. 704/8; 10/8
See application file for complete search history.

(56) References Cited

U.S. PATENT DOCUMENTS

| | | | |
|---|---|---|---|
| 5,084,833 A | | 1/1992 | Matsuda et al. |
| 5,161,118 A | | 11/1992 | Matsuda et al. |
| 5,797,098 A | * | 8/1998 | Schroeder et al. ............ 455/464 |
| 5,802,482 A | * | 9/1998 | Sun .................................. 704/8 |
| 5,893,133 A | * | 4/1999 | Chen .............................. 715/264 |
| 5,933,800 A | * | 8/1999 | Zen et al. ........................... 704/1 |
| 6,005,498 A | * | 12/1999 | Yang et al. ...................... 341/23 |
| 6,014,615 A | * | 1/2000 | Chen ................................. 704/3 |

(Continued)

FOREIGN PATENT DOCUMENTS

JP 3-28964 A 2/1991

(Continued)

OTHER PUBLICATIONS

Bing-Quan Liu; Xiao-Long Wang, "An approach to machine learning of Chinese Pinyin-to-character conversion for small-memory application," Machine Learning and Cybernetics, 2002. Proceedings. 2002 International Conference on , vol. 3, No., pp. 1287-1291 vol. 3, 2002.*

(Continued)

*Primary Examiner* — Richemond Dorvil
*Assistant Examiner* — Michael Ortiz Sanchez
(74) *Attorney, Agent, or Firm* — Birch, Stewart, Kolasch & Birch, LLP

(57) ABSTRACT

When an input section is actuated by a user, a character is inputted, and a storage section stores therein the inputted character. On this occasion, when the inputted character is a vowel character, a control section causes the storage section to store therein the inputted vowel character and an intonation associated therewith. In a case where a vowel character identical to the inputted vowel character is successively inputted by the input section, the control section causes the storage section to store therein the vowel character and the initial intonation in association with each other, for a first input. At second and subsequent inputs, the control section does not cause the storage section to store therein the identical vowel character anew, but it alters only the intonation associated with the vowel character which has been already stored in the storage section.

17 Claims, 12 Drawing Sheets

U.S. PATENT DOCUMENTS

| | | | | |
|---|---|---|---|---|
| 6,073,146 | A * | 6/2000 | Chen | 715/264 |
| 6,636,163 | B1 * | 10/2003 | Hsieh | 341/28 |
| 6,765,504 | B2 * | 7/2004 | Ouyang | 341/28 |
| 7,398,199 | B2 * | 7/2008 | Gong | 704/8 |
| 7,548,860 | B2 * | 6/2009 | Li | 704/270 |
| 7,715,882 | B2 * | 5/2010 | Oda et al. | 455/566 |
| 2002/0123367 | A1 * | 9/2002 | Savolainen et al. | 455/550 |
| 2002/0180806 | A1 * | 12/2002 | Zhang et al. | 345/816 |
| 2003/0184451 | A1 * | 10/2003 | Li | 341/22 |
| 2004/0252035 | A1 * | 12/2004 | Chang | 341/28 |
| 2005/0010391 | A1 * | 1/2005 | Chen et al. | 704/8 |
| 2005/0104869 | A1 * | 5/2005 | Chung | 345/179 |
| 2005/0114138 | A1 * | 5/2005 | Tomishige et al. | 704/260 |
| 2005/0222838 | A1 * | 10/2005 | Gong | 704/5 |
| 2006/0061491 | A1 * | 3/2006 | Qin | 341/28 |
| 2006/0242576 | A1 * | 10/2006 | Nagel et al. | 715/535 |
| 2007/0110222 | A1 * | 5/2007 | Kim | 379/355.07 |

FOREIGN PATENT DOCUMENTS

| | | |
|---|---|---|
| JP | 2506088 | 4/1996 |
| JP | 11-175511 A | 7/1999 |
| JP | 11-353096 A | 12/1999 |

OTHER PUBLICATIONS

Chen, Z. and Lee, K. 2000. A new statistical approach to Chinese Pinyin input. In Proceedings of the 38th Annual Meeting on Association for Computational Linguistics (Hong Kong, Oct. 3-6, 2000). Annual Meeting of the ACL. Association for Computational Linguistics, Morristown, NJ, 241-247.*

* cited by examiner

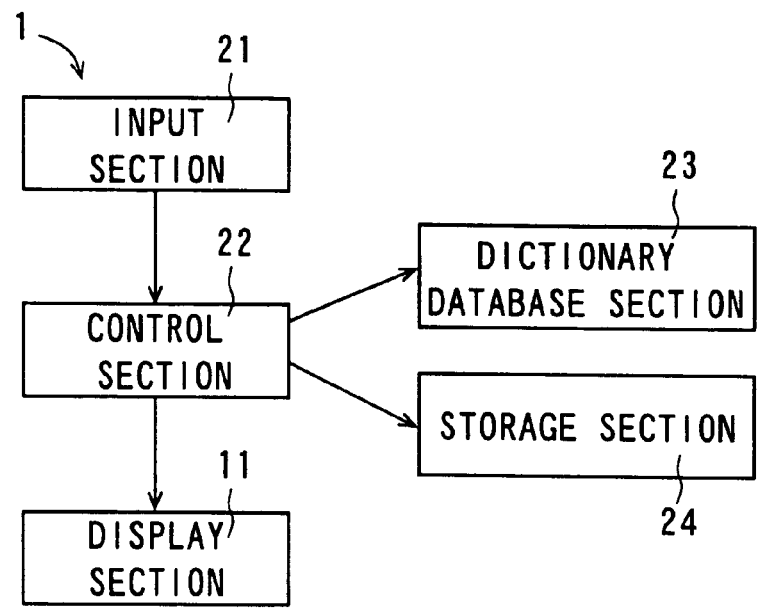
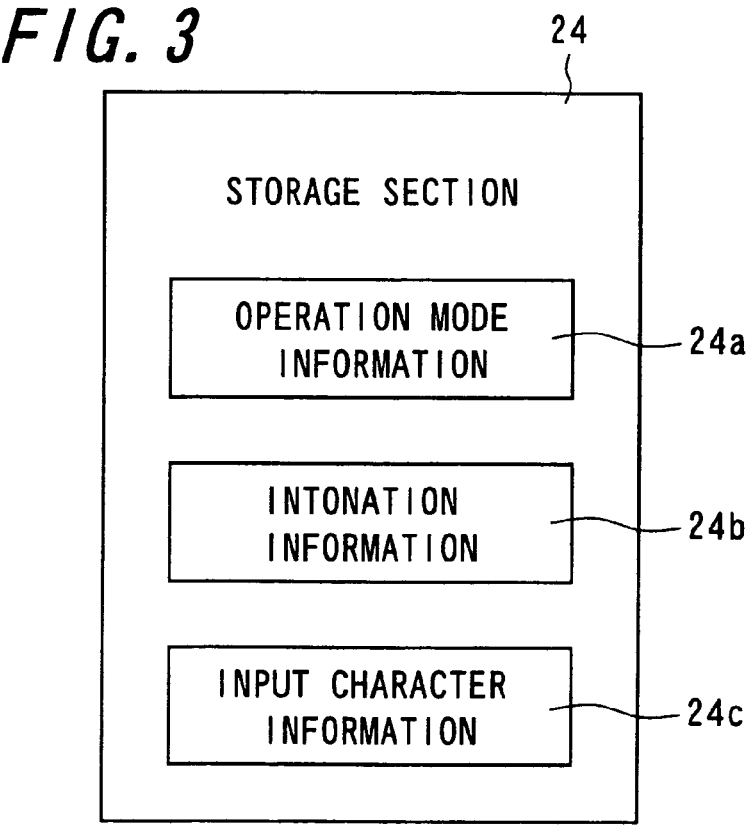

CHARACTER INPUTTING METHOD AND CHARACTER INPUTTING APPARATUS

BACKGROUND OF THE INVENTION

1. Field of the Invention

The present invention relates to a method for Chinese "Pinyin" (Chinese alphabet) input, and more particularly to a character inputting method and a character inputting apparatus which can be suitably applied to an electronic dictionary or the like in which a Chinese dictionary is installed.

2. Description of the Related Art

One of principal inputting methods for the Chinese language is an inputting method which employs Pinyin. The inputting employing the Pinyin is based on pronunciation, and inputs a syllable which is expressed by the alphabet. Besides, each individual syllable in the Chinese language has an intonation called "Sheng Diao". The intonations includes four tones (first through fourth tones) and a neutral tone, and the significances of words differ depending upon the tones. In inputting a desired character with the Pinyin, accordingly, it is desirable to input, not only the alphabet, but also the intonation.

It is also possible to input the character with the alphabet only. In that case, however, when only the same alphabetic characters are inputted as the Pinyin, even characters of different tones appear as candidates for characters to-be-inputted, and hence, the number of the candidates become very large to trouble an inputting operation. In a case where the intonation can also be inputted in addition to the alphabet, the number of the candidates for characters to-be-inputted can be decreased, and hence, the inputting operation is simplified.

Methods in the case of inputting the intonations are as described below.

In the first inputting method, a syllable is first inputted with the alphabet, a key such as shift key is depressed, and the intonations are further inputted through a numeral key or the like. By way of example, when the numeral key of "1" is depressed after the depression of the shift key, the first tone is inputted. Desired characters are inputted by repeating such inputting for individual syllables.

In the second inputting method, the alphabet is first inputted, and immediately after a vowel has been inputted, any of the four tones is inputted by depressing specified key such as a four-tone key a predetermined number of times. By way of example, when the four-tone key is depressed once after the depression of the alphabetic key of "a", the first tone is inputted.

By the way, in a data processing apparatus disclosed in Japanese Patent No. 2,506,088, a cursor is automatically moved one space in response to the fact that a key different from a last depressed key in a group of input keys has been depressed in a character input mode, or that an input mode has been changed-over from the character mode to a numeral input mode. Thus, the trouble of the inputting operation is relieved.

In the case of each of the first and second methods, the key other than alphabetic character keys needs to be depressed in the Pinyin inputting operation, and there is the problem that the inputting operation is still troublesome. Moreover, in the case of the second method, the key for inputting the intonations needs to be additionally disposed, and a cost is raised.

SUMMARY OF THE INVENTION

An object of the invention is to provide a character inputting method and a character inputting apparatus which can input intonations or "Sheng Diao" through a simple operation without altering the construction of input means from a standard construction.

The invention provides a character inputting method for Chinese Pinyin input, comprising:
  detecting an input of a vowel character;
  providing an intonation for the inputted vowel character; and
  when a vowel character identical to the inputted vowel character is successively inputted, providing a different intonation for the successively inputted vowel character.

Besides, the invention provides a character inputting method for Chinese Pinyin input, comprising:
  detecting an input of a vowel character;
  providing an intonation for the inputted vowel character; and
  when a vowel character identical to the inputted vowel character is successively inputted, providing a different intonation for the vowel character inputted at a first one of the successive inputs with regard to second and subsequent inputs.

Besides, in the invention, the provision of the different intonation is based on an intonation at a last input and a predetermined sequence.

Besides, in the invention, the predetermined sequence is in order of a neutral tone, a first tone, a second tone, a third tone, a fourth tone, and the neutral tone.

Besides, in the invention, when a different vowel character or a consonant character is inputted in succession to the successive inputs of the identical vowel character,
  an intonation provided at a last one of the successive inputs is validated as an intonation of the inputted vowel character.

Besides, in the invention, when movement of a cursor is inputted in succession to the successive inputs of the identical vowel character,
  an intonation provided at a last one of the successive inputs is validated as an intonation of the inputted vowel character.

Besides, the invention provides a character search method comprising:
  making a search on the basis of the Pinyin inputted by the character inputting method;
  when the intonation of the vowel character has been altered, making a search in accordance with the alteration; and
  outputting the search results.

Besides, in the invention, the search results are outputted by displaying them on a screen, and
  when all the search results cannot be displayed by one frame, the search results are displayed by scrolling the screen.

Besides, the invention provides a character inputting method for Chinese Pinyin input, comprising:
  detecting an input of a predetermined character;
  providing an intonation for the inputted predetermined character; and
  when a character identical to the inputted predetermined character is successively inputted, providing a different intonation of the inputted predetermined character.

Besides, the invention provides a character inputting apparatus for Chinese Pinyin input, comprising:
  input means for making an input of a character;
  storage means for storing therein the inputted character; and
  control means for causing when the inputted character is a vowel character, the storage means to store therein the inputted vowel character and its intonation associated therewith,
  wherein, when a vowel character identical to the inputted vowel character is successively inputted by the input means, the control means alters only the intonation associated with the vowel character stored in compliance with a first one of the successive inputs, without causing the storage means to store therein the inputted vowel character anew, in compliance with second and subsequent inputs.

According to the invention, in Chinese Pinyin input, when the vowel character identical to the inputted vowel character is successively inputted, the different intonation is provided for the successively inputted vowel character.

By way of example, when the user successively depresses an input key of the identical vowel character, the intonation of the depressed vowel character can be altered.

Thus, any element for inputting the intonations need not be added, so that the intonations can be inputted without altering the construction of input means such as a keyboard from a standard construction. Moreover, any key other than character inputting keys need not be depressed for the purpose of inputting the intonations, so that the intonations can be inputted by a simple operation.

Besides, according to the invention, in Chinese Pinyin input, when the vowel character identical to the inputted vowel character is successively inputted, the intonation of the vowel character inputted at the first one of the successive inputs is altered, in compliance with the second and subsequent inputs.

By way of example, when the user depresses the input key of the identical vowel character "a" twice in succession, the vowel character "a" and a predetermined intonation are inputted by the first key depression. When the second key depression is subsequently done, the character "a" is not inputted anew, that is, the inputted character remains unchanged at the character "a" inputted by the first key depression, unlike the characters "aa", and only the intonation is altered. Accordingly, when the input key of the vowel character is successively depressed, the intonation can be altered every depression.

Thus, any element for inputting the intonations need not be added, so that the intonations can be inputted without altering the construction of input means such as a keyboard from a standard construction. Moreover, any key other than character inputting keys need not be depressed for the purpose of inputting the intonations, so that the intonations can be inputted by a simple operation.

Besides, according to the invention, the provision of the different intonation is based on an intonation at the last input and a predetermined sequence. Herein, the predetermined sequence is in order of a neutral tone, a first tone, a second tone, a third tone, a fourth tone, and the neutral tone.

By way of example, in a case where the intonation at the last input is the neutral tone, the intonation is altered to the first tone next to the neutral tone, in conformity with the sequence at the current input. Likewise, in a case where the intonation at the last input is the first tone, it is altered to the next second tone; in a case where the intonation at the last input is the second tone, it is altered to the next third tone; and in a case where the intonation at the last input is the third tone, it is altered to the next fourth tone. By the way, in a case where the intonation at the last input is the fourth tone, it is altered to the neutral tone.

Thus, the intonations can be easily inputted in accordance with the number of times of the input Besides, according to the invention, when a different vowel character or a consonant character is inputted in succession to the successive inputs of the identical vowel character, an intonation provided at the last one of the successive inputs is validated as an intonation of the inputted vowel character.

By way of example, when the input key of the different vowel character "e" or the consonant character "b" is depressed after the input key of the vowel character "a" has been depressed three times, the second tone to which the intonation has been altered by the third depression of the input key of the character "a" is validated as the intonation of the character "a". Besides, simultaneously with the validation of the intonation, the character "e" or "b" is inputted.

Besides, according to the invention, when movement of a cursor is inputted in succession to the successive inputs of the identical vowel character, an intonation provided at the last one of the successive inputs is validated as an intonation of the inputted vowel character.

By way of example, when the right key of cursor keys is depressed after the input key of the identical vowel character "a" has been depressed three times, the second tone to which the intonation has been altered by the third depression of the input key of the character "a" is validated as the intonation of the character "a". Besides, simultaneously with the validation of the intonation, a cursor position is moved rightwards.

Besides, according to the invention, a predetermined database, for example, the database of a Chinese-Japanese dictionary is searched on the basis of the Pinyin inputted by the character inputting method, and results obtained by the search are outputted. On this occasion, when the intonation of a vowel character has been altered, the search is made in accordance with the alteration, and the search results are outputted.

Thus, the user can make the new search and confirm the search results thereof, merely by altering the intonation, that is, by depressing the key of the identical vowel character.

Besides, according to the invention, the search results are outputted by displaying them on a screen, and when all the search results cannot be displayed by one frame, the search results are displayed by scrolling the screen.

Thus, even when the search results are large in number, the user can confirm all the search results.

Besides, according to the invention, in Chinese Pinyin input, when the character identical to the inputted predetermined character is successively inputted, the different intonation is provided for the inputted predetermined character.

In the Chinese language, even a character "m" or "n" which is other than vowel characters "a", "i", "u", "e" and "o" has intonations. Accordingly, when the input has been made for inputting either of the predetermined characters "m" and "n" in addition to the vowel characters "a", "i", "u", "e" and "o", the intonation of the inputted predetermined character can be altered.

Thus, any element for inputting the intonations need not be added, so that the intonations can be inputted without altering the construction of input means such as a keyboard from a standard construction. Moreover, any key other than character inputting keys need not be depressed for the purpose of inputting the intonations, so that the intonations can be inputted by a simple operation.

Besides, according to the invention, when a character is inputted by the input means, the storage means stores therein the inputted character. Herein, when the inputted character is a vowel character, the control means causes the storage means to store therein the inputted vowel character and an intonation associated therewith.

When the vowel character identical to the inputted vowel character is successively inputted by the input means, the control means causes the storage means to store therein the vowel character and an initial tone, for example, the neutral tone in association, in compliance with the first input. The control means alters only the intonation associated with the vowel character which has been already stored, without causing the storage means to store therein the inputted vowel character anew, in compliance with the second and subsequent inputs.

Thus, any element for inputting the intonations need not be added, so that the intonations can be inputted without altering the construction of input means such as a keyboard from a standard construction. Moreover, any key other than character inputting keys need not be depressed for the purpose of inputting the intonations, so that the intonations can be inputted by a simple operation.

BRIEF DESCRIPTION OF THE DRAWINGS

Other and further objects, features, and advantages of the invention will be more explicit from the following detailed description taken with reference to the drawings wherein:

FIG. 2 is a block diagram showing an electrical construction of the electronic dictionary apparatus;

FIG. 3 is a diagram showing a structure of a storage section;

FIGS. 6A to 6D are diagrams each showing a display screen example in the case of Pinyin inputting;

DETAILED DESCRIPTION

Figure 1:
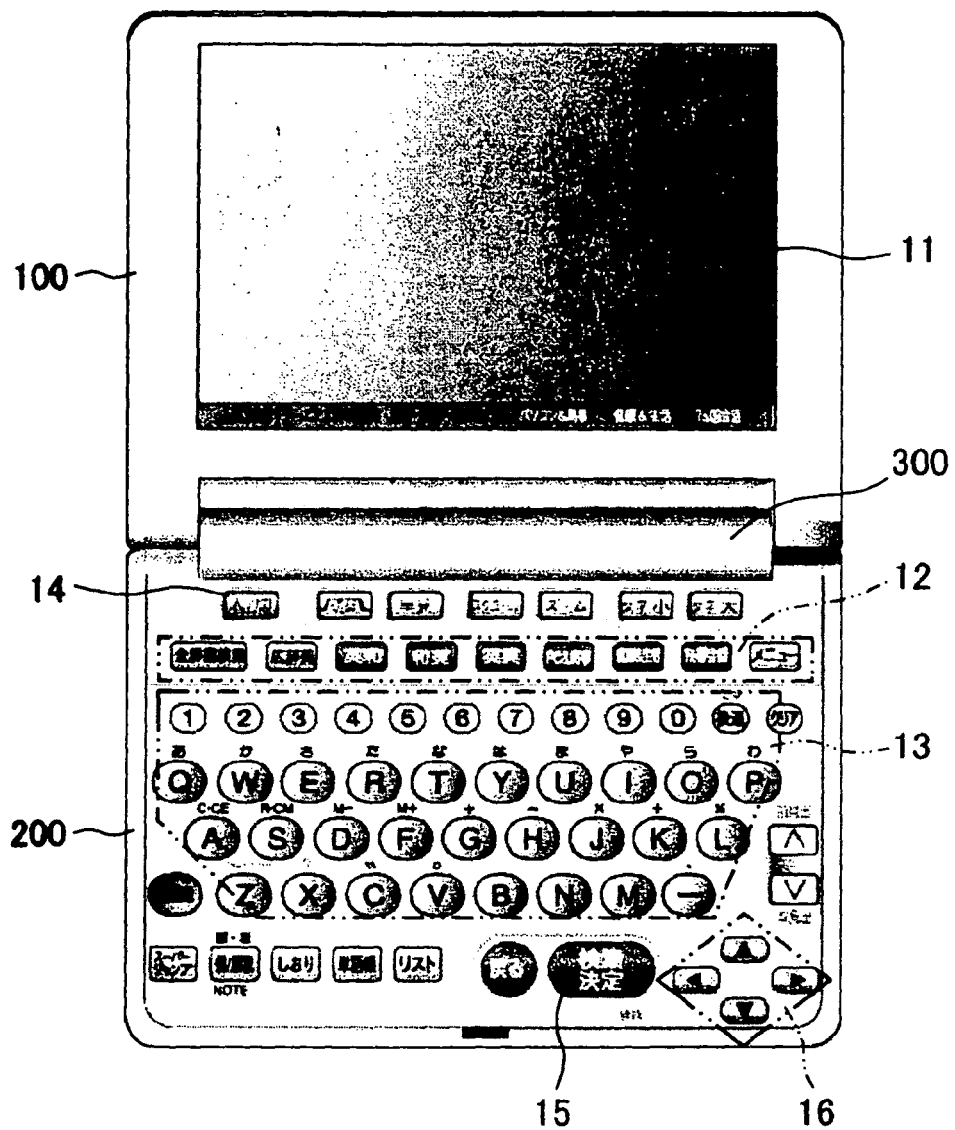
FIG. 1 is an exterior view of an electronic dictionary apparatus according to an embodiment of the invention.

Now referring to the drawings, preferred embodiments of the invention are described below.

The invention will be described below by taking as an example, character inputting in the case where a Chinese language search is made by employing Pinyin in an electronic dictionary apparatus. Incidentally, the electronic dictionary apparatus is constructed including a character inputting apparatus.

FIG. 1 is an exterior view of an electronic dictionary apparatus 1 according to an embodiment of the invention. The electronic dictionary apparatus 1 includes a display section 11, function keys 12, character keys 13, a power switch 14, a "determine" key 15 and cursor keys 16. Besides, the electronic dictionary apparatus 1 has a first casing 100 in which the display section 11 is disposed, and a second casing 200 in which various keys such as the character keys 13 are disposed. Herein, the first casing 100 and the second casing 200 are connected through a hinge 300. While the electronic dictionary apparatus 1 is not used, the first casing 100 and the second casing 200 can be folded up into a compact structure.

The display section 11 is realized by an LCD (liquid crystal display) or the like, and it is display means for displaying a menu screen, inputted characters, the search result of a word expressed by the characters, and so forth. The function keys 12 include, for example, a Japanese-Chinese key and a Chinese-Japanese key, and they are depressed in selecting the various operation modes of the electronic dictionary apparatus 1. The character keys 13 are constituted by a group of keys which include alphabetic character keys and "kana" (Japanese alphabet) keys, and besides, numeral keys and symbol keys, and they are depressed in inputting alphabetic characters etc. The power key 14 is depressed when the power source of the electronic dictionary apparatus 1 is turned ON/OFF. The "determine" key 15 is depressed in validating predetermined inputting and selection. The cursor keys 16 are constituted by "up", "down", "right" and "left" keys, and they are depressed in moving a cursor displayed on the display section 11, and scrolling the display screen of the display section 11.

FIG. 2 is a block diagram showing the electrical construction of the electronic dictionary apparatus 1. The electronic dictionary apparatus 1 has the display section 11, an input section 21, a control section 22, a dictionary database section 23 and a storage section 24. The input section 21 is user-actuated input means for making an input request for a character or the like which is to be searched for, or for making an input request for a control command. This input section 21 includes the function keys 12, character keys 13, power key 14, "determine" key 15 and cursor keys 16 shown in FIG. 1. The control section 22 is realized by a CPU (central processing unit) or the like. This control section 22 is control means for controlling the whole electronic dictionary apparatus 1 by executing a character input process in which an input request for a character is detected in compliance with the user's actuation of the input section 21 and the requested character to be inputted is stored in the storage section 24, a search process in which dictionary data stored in the dictionary database section 23 is searched for with the inputted character as a search key, a display process in which a character input screen, a menu screen, a search result screen or the like is displayed on the display section 11, a storage process in which a search history or the like is stored in the storage section 24, and so forth. The dictionary database section 23 contains, at least, Chinese-Japanese dictionary data. Herein, "dictionary data" are data obtained by electronicizing the contents of dictionaries such as a Chinese-Japanese dictionary. In the case of the Chinese-Japanese dictionary data, for example, the dictionary data are data in which various information items, such as each headword containing Pinyin and "kanji" (Chinese character) in the Chinese language, the significances of words and phrases, and illustrative sentences using the headword, are associated. The storage section 24 is storage means for prestoring therein programs for executing the character input process, the search process, the display process, etc., and for temporarily storing therein information necessary for the processes.

FIG. 3 is a diagram showing the structure of the storage section 24. The storage section 24 includes operation mode information 24a, intonation information 24b and input character information 24c. The operation mode information 24a stores a current operation mode (intonation selection mode, or addition/insertion mode) in the character input process. The intonation information 24b stores intonations (neutral tone, first tone, second tone, third tone or fourth tone) in association with a currently inputted vowel character during the operation of the intonation selection mode. The input character information 24c stores a requested character to-be-inputted in the character input process.

FIGS. 4A to 4F are diagrams each showing a display screen example in the case of Pinyin inputting. Now, a character inputting procedure based on the Pinyin inputting will be described with reference to FIGS. 4A to 4F.

Figure 4A:
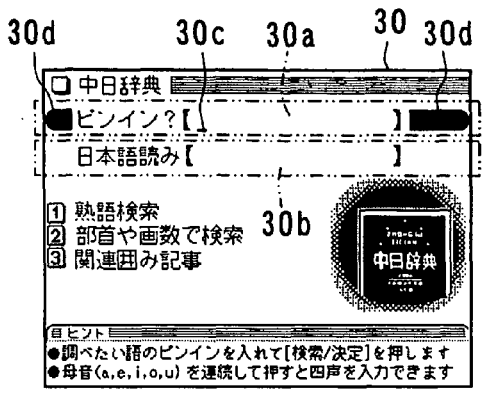
FIGS. 4A to 4F are diagrams each showing a display screen example in the case of Pinyin inputting.

When the user depresses the power key 14 in the OFF state of the power source of the electronic dictionary apparatus 1, the power source is turned ON, and an initial screen, for example, main menu screen is displayed on the display section 11. When the user selects the Chinese-Japanese dictionary from within a main menu or depresses a Chinese-Japanese key, a Chinese-Japanese-dictionary initial screen 30 shown in FIG. 4A is displayed on the display section 11. The Chinese-Japanese-dictionary initial screen 30 has a Pinyin input region 30a and a Japanese-reading input region 30b. In case of character inputting based on the Pinyin inputting, the Pinyin in terms of the alphabet is inputted to the Pinyin input region 30a, while in case of character inputting based on Japanese-reading inputting, "kana" is inputted to the Japanese-reading input region 30b. Which of the input regions is to be used, can be selected through the up or down key of the cursor keys 16. A cursor 30c is displayed in the selected input region, and also a selection symbol 30d is displayed therein.

Figure 4B:
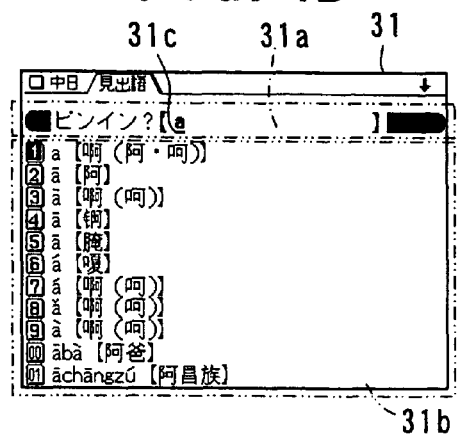

When the alphabet is inputted to the Pinyin input region 30a in the state where the Chinese-Japanese-dictionary initial screen 30 is displayed, a character inputting screen 31 shown in FIG. 4B is displayed on the display section 11. A case where "a" being a vowel character has been inputted as the Pinyin, will be described here. The character inputting screen 31 has a Pinyin input region 31a and a search result display region 31b. When the "a" key of the character keys 13 is depressed in the state where the Chinese-Japanese-dictionary initial screen 30 is displayed, the character inputting screen 31 is displayed, and "a" as the neutral tone is displayed in the Pinyin input region 31a. A cursor 31c is displayed at the position of the character "a". Here, when the "a" key is subsequently depressed, "a" as the first tone is displayed in a Pinyin input region 32a as shown in a character inputting screen 32 in FIG. 4C. In order for the user to understand that displayed is the character "a" of the first tone, an intonational symbol 32d expressive of the first tone is displayed. A cursor 32c is displayed at the position of the character "a".

Figure 4C:
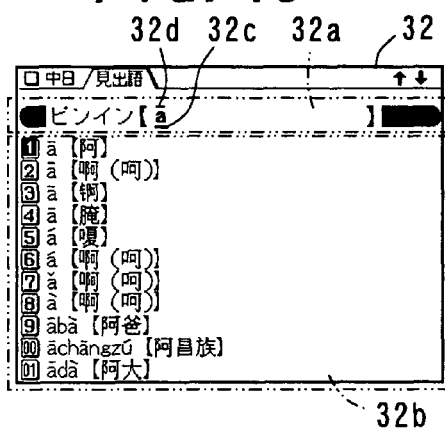
Figure 4D:
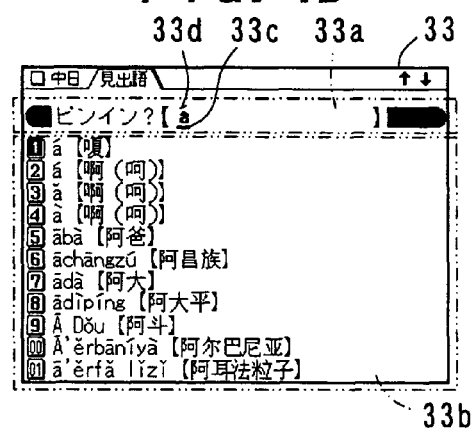

Subsequently, when the "a" key is depressed, "a" as the second tone is displayed in a Pinyin input region 33a as shown in a character inputting screen 33 in FIG. 4D. In order for the user to understand that displayed is the character "a" of the second tone, an intonational symbol 33d expressive of the second tone is displayed. A cursor 33c is displayed at the position of the character "a". Further, when the "a" key is depressed, "a" as the third tone is displayed in a Pinyin input region 34a as shown in a character inputting screen 34 in FIG. 4E. In order for the user to understand that displayed is the character "a" of the third tone, an intonational symbol 34d expressive of the third tone is displayed. A cursor 34c is displayed at the position of the character "a". Still further, when the "a" key is depressed, "a" as the fourth tone is displayed in a Pinyin input region 35a as shown in a character inputting screen 35 in FIG. 4F. In order for the user to understand that displayed is the character "a" of the fourth tone, an intonational symbol 35d expressive of the fourth tone is displayed. A cursor 35c is displayed at the position of the character "a". When the "a" key is depressed in the state where the character "a" of the fourth tone is displayed, the character "a" as the neutral tone is displayed again. Thenceforth, when the "a" key is depressed, the character "a" is repeatedly changed in a predetermined sequence, namely, in the order of the neutral tone, first tone, second tone, third tone, fourth tone and neutral tone.

In this manner, when the identical vowel character key is successively depressed in inputting the vowel character, the intonations for the particular vowel character can be inputted. Since the identical vowel character key may merely be depressed in succession for inputting the intonations, any key for inputting the intonations is not required, and any key other than the character key need not be depressed in the course of an inputting operation. Accordingly, the intonations can be inputted by the simple operation without altering a standard key construction.

When a character different from the currently inputted vowel character (including a different vowel character) is inputted as the next character, an intonation at the point of time at which the next character has been inputted is validated, and the cursor moves to the next character position.

Figure 4E:
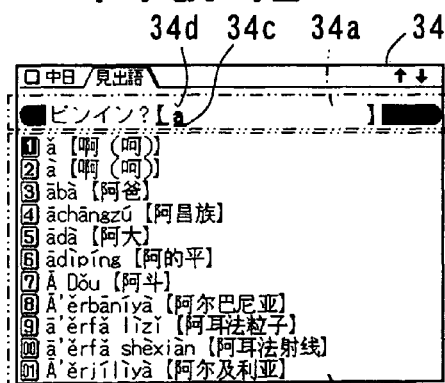
Figure 4F:
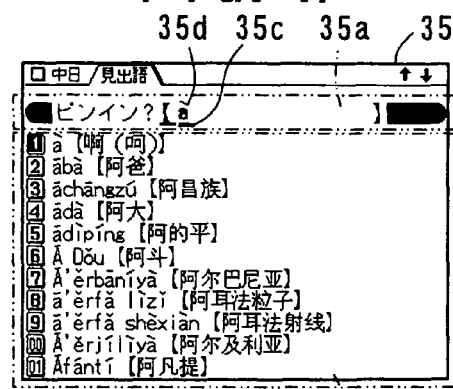

Besides, as shown in FIG. 4B, candidates for a headword are displayed in the search result display region 31b as search results which have been obtained using the character "a" of the neutral tone as a search key. Incidentally, not only the search result for the character "a" of the neutral tone, but also the search results for the character "a" of the first tone through that of the fourth tone are displayed in the search result display region 31b. The reason therefor is that even the user who does not know the intonations is permitted to make the search merely be inputting the alphabet. However, in the case where an intonation is not inputted, the candidates for the headword are displayed in the order of the neutral tone, first tone, second tone, third tone and fourth tone as shown in the figure, and hence, a long time is expended before the user finds the desired headword. In contrast, when the intonation is inputted by the method as explained above, the sequence of the candidates for the headword to be displayed in the search result display region 31b changes in accordance with the intonation. As shown in FIG. 4C, for example, when the character "a" of the first tone is inputted to and displayed in the Pinyin input region 32a, candidates for the character "a" of the first tone are displayed in the forefront in a search result display region 32b, followed by candidates for the second tone, third tone and fourth tone in the order mentioned. Also in the case where any other intonations have been inputted, candidates for the intonation inputted to and displayed in the Pinyin input region 32a are similarly displayed in the forefront. As shown in FIG. 4D, when the character "a" of the second tone is inputted to and displayed in the Pinyin input region 33a, candidates for the character "a" of the second tone are displayed in the forefront in a search result display region 33b, followed by candidates for the third tone and fourth tone in the order mentioned. Also, as shown in FIG. 4E, when the character "a" of the third tone is inputted to and displayed in the Pinyin input region 34a, a candidate for the character "a" of the third tone is displayed in the forefront in a search result display region 34b, followed by candidates for the fourth tone in the order mentioned.

Incidentally, when the user selects the desired headword from among the headwords displayed in the search result display region, information items, such as the meanings of words and phrases and illustrative sentences, stored in the dictionary database section 23 are displayed on the display section 11. By way of example, the desired headword can be selected by depressing a numeral key which corresponds to a No. assigned to the desired candidate as shown in FIG. 4B. Alternatively, the desired headword can be selected by highlighting a No. assigned to the desired candidate by depressing the up or down key of the cursor keys 16, and thereafter depressing the "determine" key 15. In a case where the number of the candidates for the headword is too large to be displayed by one frame, the down key of the cursor keys 16 is successively depressed to the No. of the lowermost candidate currently displayed, so as to highlight the lowermost candidate, and the down key is further depressed, whereby the frame can be scrolled to display other candidates.

In the Pinyin inputting, an identical vowel character is sometimes inputted in succession. In this regard, when the key of the identical vowel character is merely depressed successively as explained above, only the intonation is changed, and the identical vowel character cannot be successively inputted. In the case where the identical vowel character is to be successively inputted, a procedure as described below can be employed.

FIGS. 5A to 5D are diagrams each showing a display screen example in the case of the Pinyin inputting. Now, a character inputting procedure in the case of successively inputting the identical vowel character will be described with reference to FIGS. 5A to 5D.

Figure 5A:
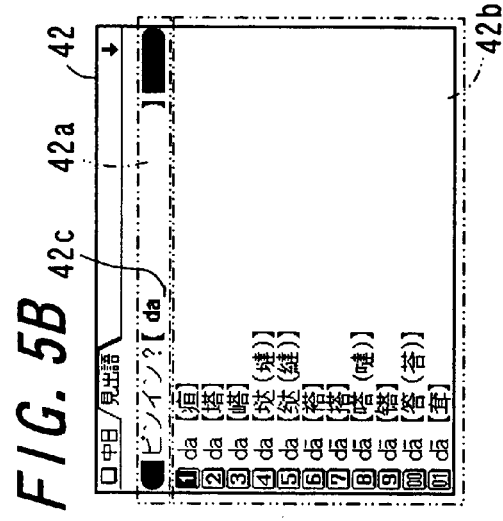
FIGS. 5A to 5D are diagrams each showing a display screen example in the case of Pinyin inputting.

Here, it is assumed to input "daan" as the Pinyin. A character inputting screen 41 shown in FIG. 5A indicates a state where characters "da" have been inputted in conformity with the procedure described before. The characters "da" are displayed in a Pinyin input region 41a, and a cursor 41c is displayed at the position of the character "a" inputted last. Here, when the "a" key is subsequently depressed, merely the intonation of the character "a" at the cursor position changes from the neutral tone to the first tone, and the character "a" cannot be successively inputted. Accordingly, in order to successively input the identical vowel character "a", the cursor is moved to an adjacent position, and the "a" key is thereafter depressed. When the right key of the cursor keys 16 is depressed in the state where the character inputting screen 41 shown in FIG. 5A is displayed, a cursor 42c is moved to the adjacent position to the character "a" of the characters "da" in a Pinyin input region 42a as shown in a character inputting screen 42 in FIG. 5B. When the "a" key is depressed in this state, the intonation of the first occurring character "a" is not changed, and the second occurring character "a" is successively displayed in a Pinyin input region 43a as shown in a character inputting screen 43 in FIG. 5C, so that the identical vowel character can be inputted in succession. A cursor 43c is displayed at the position of the second occurring character "a". When an "n" key is subsequently depressed, a character "n" is displayed at a position adjacent to the second occurring character "a" in a Pinyin input region 44a as shown in a character inputting screen 44 in FIG. 5D, so that the desired Pinyin characters "daan" can be inputted. Since the character "n" of a consonant has been inputted, a cursor 44c is moved to and displayed at a position adjacent to the character "n".

In this way, the identical vowel character can be successively inputted by moving the cursor.

As in the case described in conjunction with FIGS. 4A to 4F, search results obtained with a search key being the characters inputted to the Pinyin input region are displayed in a search result display region. By way of example, when the characters "da" are inputted to and displayed in the Pinyin input region 41a as shown in FIG. 5A, candidates for the characters "da" of the neutral tone are displayed in the forefront in a search result display region 41b, followed by candidates for the first tone. Also, when the characters "daa" are inputted to and displayed in the Pinyin input region 43a as shown in FIG. 5C, candidates for the characters "daa" of the neutral tone are displayed in the forefront in a search result display region 43b. By the way, in the example of FIG. 5C, any candidate matching with the characters "daa" of the neutral tone is not existent in the dictionary database section 23, and hence, candidates are displayed successively from the closest one with the intonations taken into consideration. When the characters "daan" are inputted to and displayed in the Pinyin input region 44a as shown in FIG. 5D, candidates for the characters "daan" of the neutral tone are displayed in the forefront in a search result display region 44b. As in FIG. 5C, any candidate matching with the characters "daan" of the neutral tone is not existent in the dictionary database section 23, and only one candidate containing the characters "daa" is existent, so that the display of the search result display region 44b does not change from the display of the search result display region 43b. Besides, since merely the cursor 42c has been moved in FIG. 5B, a search key does not change, and the display of a search result display region 42b does not change from the display of the search result display region 41b.

In a case where the intonation of a vowel character which has been already inputted is to be changed, a procedure as described below can be employed.

FIGS. 6A to 6D are diagrams each showing a display screen example in the case of the Pinyin inputting. Now, a character inputting procedure in the case of changing the intonation of the vowel character which have been already inputted will be described with reference to FIGS. 6A to 6D.

Here, it is assumed that characters "baozi" have already been inputted as the Pinyin, and that the intonation of the character "a" be changed from the neutral tone to the second tone. A character inputting screen 51 shown in FIG. 6A indicates a state where the characters "baozi" have been inputted in conformity with the procedure described before. The characters "baozi" are displayed in a Pinyin input region 51a, and a cursor 51c is displayed at the position of the character "i" inputted last. Here, after the cursor is moved to the position of the character "a", the "a" is deleted and the "a" key is depressed a plurality of times.

Figures 6A, 6B, 6C, 6D:
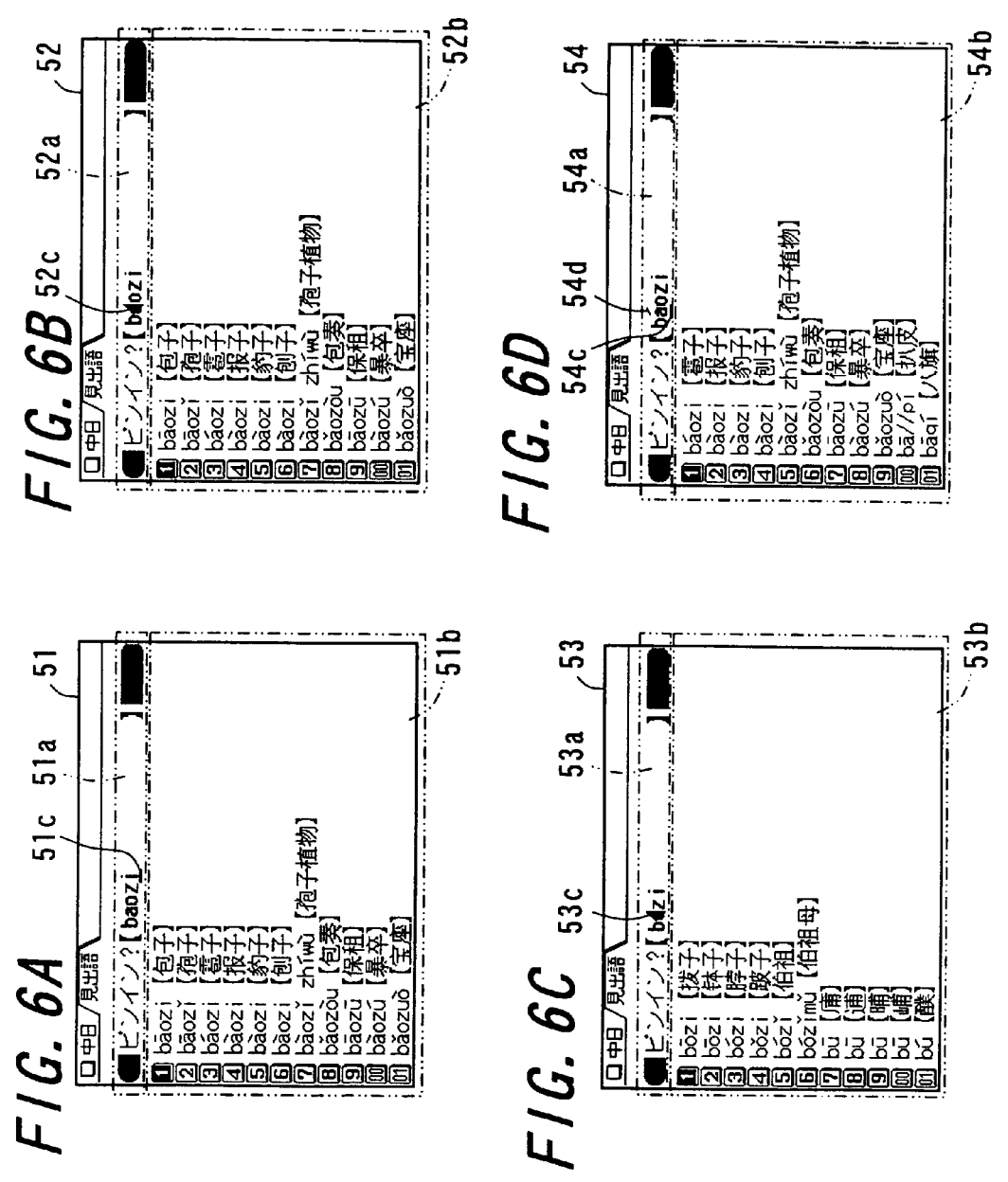

When the left key of the cursor keys 16 is successively depressed three times in the state where the character inputting screen 51 shown in FIG. 6A is displayed, a cursor 52c is moved to the position of the character "a" in a Pinyin input region 52a as shown in a character inputting screen 52 in FIG. 6B. By the way, in the case of moving the cursor to the position of the character which has been already inputted, a cursor shape is changed in order for the user to understand the cursor movement to the position of the inputted character. In FIG. 6B, the cursor 52c in the changed shape is displayed at the position of the character "a". When a "delete" key is depressed in the state where the cursor 52c lies at the position of the character "a", the character "a" at the cursor position is deleted as shown in a character inputting screen 53 in FIG. 6C, and the Pinyin inputted to and displayed in a Pinyin input region 53a is once changed to the characters "bozi". Here, when the "a" key is successively depressed three times with the cursor position left intact, the character "a" of the second tone is displayed between the displayed characters "b" and "o" in a Pinyin input region 54a as shown in a character inputting screen 54 in FIG. 6D. On this occasion, a cursor 54c is displayed at the position of the inputted character "a", and an intonational symbol 54d expressive of the second tone is displayed.

In this way, the intonation of the character which has been already inputted can be changed by deleting this character once.

As in the cases described in conjunction with FIGS. 4A to 4F and FIGS. 5A to 5D, search results obtained with a search key being the characters inputted to the Pinyin input region are displayed in a search result display region. By way of example, when the characters "baozi" are inputted to and displayed in the Pinyin input region 51a as shown in FIG. 6A, candidates for the characters "baozi" of the neutral tone are displayed in the forefront in a search result display region 51b. Incidentally, since any candidate matching with the characters "baozi" of the neutral tone is not existent in the dictionary database section 23, candidates are displayed successively from ones for the first tone. When the character "a" is deleted, the characters "bozi" are once displayed in the Pinyin input region 53a as shown in FIG. 6C, candidates for the characters "bozi" of the neutral tone are displayed in the forefront in a search result display region 53b. By the way, in the example of FIG. 6C, any candidate matching with the characters "bozi" of the neutral tone is not existent in the dictionary database section 23, and hence, candidates are displayed successively from the closest one with the intonations taken into consideration. As shown in FIG. 6D, when the characters "baozi" containing the characters "ba" of the second tone are inputted to and displayed in the Pinyin input region 54a, a candidate for the characters "baozi" containing the characters "ba" of the second tone is displayed in the forefront in a search result display region 54b. Besides, since the cursor 52c has merely been moved in FIG. 6B, the search key does not change, and the display of a search result display region 52b does not change from the display of the search result display region 51b.

FIG. 7 to FIG. 11 are flow charts showing the character input process described in conjunction with FIG. 4A to FIG. 6D.

Figure 7:
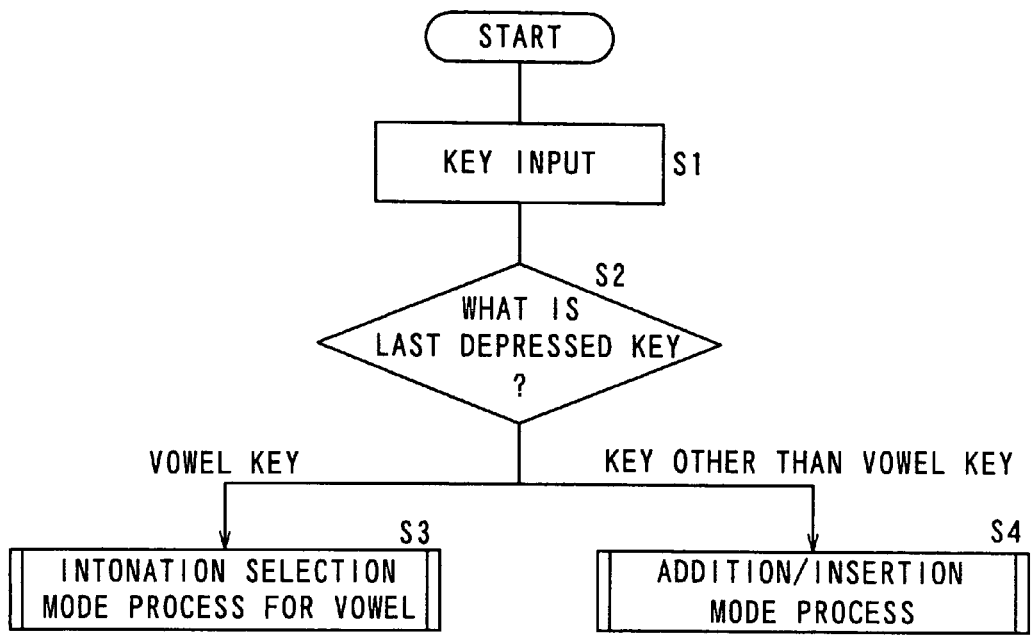
FIG. 7 is a flow chart showing an initial process in the case of inputting a character to the Pinyin input region.

FIG. 7 is the flow chart showing an initial process in the case of inputting a character to the Pinyin input region. First, any key in the input section 21 is depressed by the user at step S1. When the control section 22 accepts an input request for the key, it judges at step S2 whether the sort of a key depressed last is a vowel key or any key other than the vowel key. In a case where the sort of the last depressed key is the vowel key, it is stored in the operation mode information 24a of the storage section 24 that the last operation mode is the intonation selection mode, while in a case where the sort of the last depressed key is other than the vowel key, it is stored in the operation mode information 24a of the storage section 24 that the last operation mode is the addition/insertion mode. Accordingly, the control section 22 makes the judgment at step S2 by referring to the operation mode information 24a of the storage section 24.

On condition that the sort of the last depressed key is the vowel key, the routine proceeds to step S3, at which an intonation selection mode process is executed. In contrast, on condition that the key sort is the key other than the vowel key, the routine proceeds to step S4, at which an addition/insertion mode process is executed.

By the way, in such cases where the power source of the electronic dictionary apparatus 1 has been turned OFF and where the Chinese-Japanese dictionary has been quitted, the addition/insertion mode is stored as the last operation mode in the operation mode information 24a of the storage section 24. Accordingly, in a case where the key input has been received in the state in which the Chinese-Japanese-dictionary initial screen 30 shown in FIG. 4A is displayed, the last depressed key is actually nonexistent, but the addition/insertion mode is stored as the last operation mode in the operation mode information 24a of the storage section 24, so that the routine proceeds to step S4.

Figure 8:
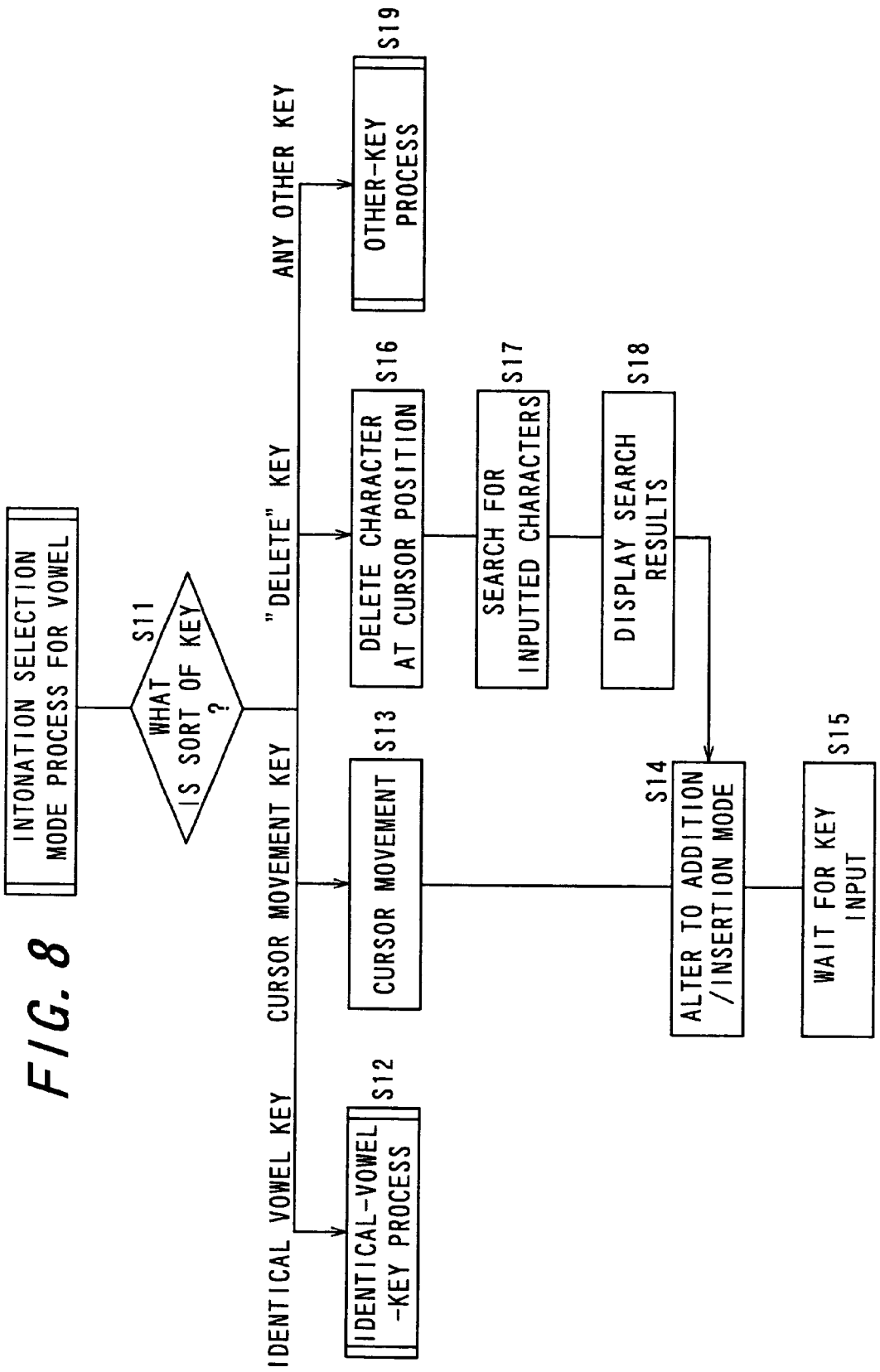
FIG. 8 is a flow chart showing the intonation selection mode process.

FIG. 8 is the flowchart showing the intonation selection mode process. In the intonation selection mode process for the vowel, the control section 22 first judges at step S11 which of the identical vowel key, the cursor key, the "delete" key and any other key the sort of the depressed key corresponds to.

On condition that the depressed key is the identical vowel key, the control section 22 judges that the request has been made for inputting the identical vowel character in succession, and the routine proceeds to step S12, at which an identical-vowel-key process is executed. On condition that the depressed key is the cursor key, the routine proceeds to step S13, at which the cursor position is moved in the direction of the depressed cursor key. At step S14, the addition/insertion mode is stored as the last operation mode in the operation mode information 24a of the storage section 24, and a key input waiting state is established at step S15.

Figure 5B:
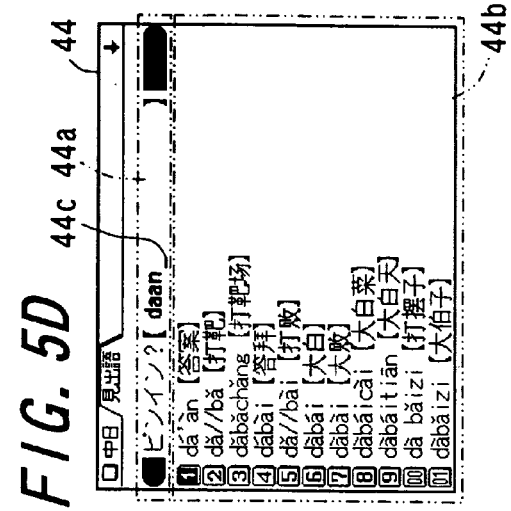
Figure 5C:
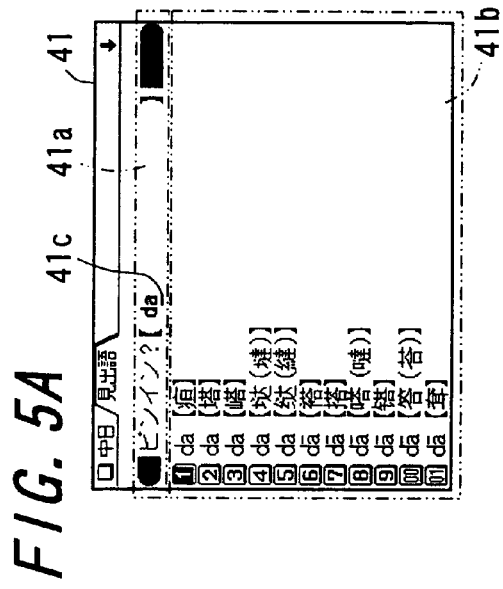
Figure 5D:
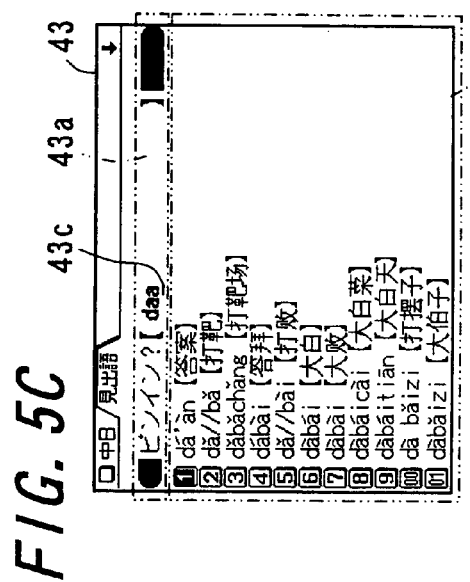

Such processing is carried out during, for example, the operation explained in conjunction with FIGS. 5A through 5C. In FIG. 5A, the "a" key has been depressed last, and hence, the operation mode has been shifted to the intonation selection mode. The right key of the cursor keys 16 is depressed in FIG. 5B, so that the routine proceeds to step S13 upon the judgment of step S11. Since the operation mode is changed-over to the addition/insertion mode by the depression of the cursor key, the identical vowel character can be successively inputted as shown in FIG. 5C.

On condition that the depressed key has been judged as the "delete" key at step S11, the routine proceeds to step S16. After the character at the cursor position has been deleted at step S16, the routine proceeds to step S17. Since the Pinyin stored in the input character information 24c is altered at step S16, the control section 22 searches the dictionary database section 23 with the new Pinyin as a search key, at step S17. Candidates for a headword are displayed as search results in the search result display region at step S18, whereupon the routine proceeds to step S14 and thereafter the key input waiting state is established at step S15. On condition that the depressed key has been judged as any other key at step S11, the routine proceeds to step S19, at which an other-key process is executed.

Figure 9:
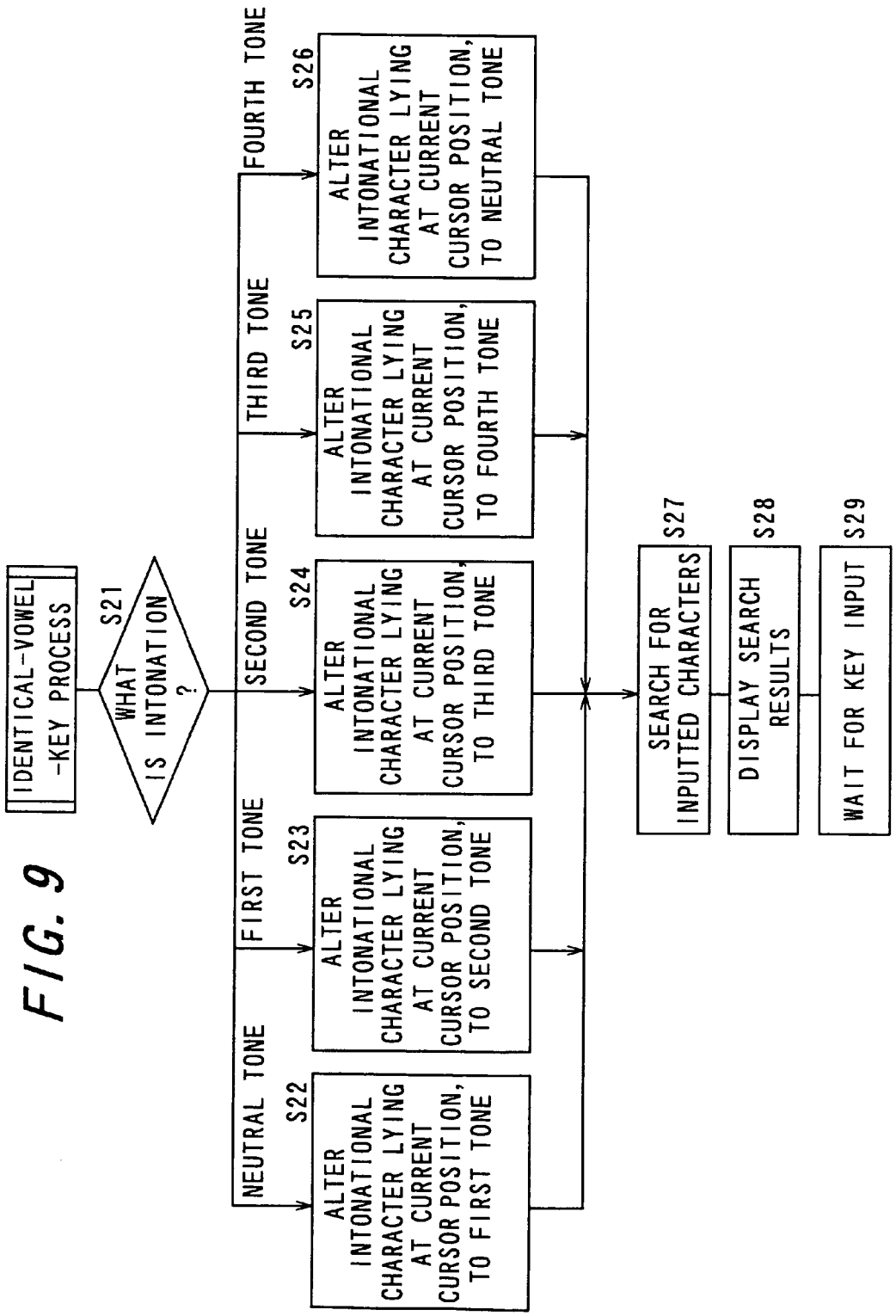
FIG. 9 is a flow chart showing the identical-vowel-key process at step S12 in FIG. 8.

FIG. 9 is the flow chart showing the identical-vowel-key process at step S12 in FIG. 8. First, at step S21, the control section 22 judges the current intonation of the vowel character lying at the cursor position. Since the current intonation is stored in the intonation information 24b of the storage section 24, the control section 22 judges the current intonation by referring to this intonation information. Incidentally, the initial intonation is the neutral tone, and the neutral tone is stored in the intonation information 24b of the storage section 24 at the time of, for example, the turn-ON of the power source of the electronic dictionary apparatus 1. Also, when the intonation selection mode has been changed-over to the addition/insertion mode, the neutral tone is stored in the intonation information 24b.

On condition that the current intonation has been judged as the neutral tone at step S21, the routine proceeds to step S22, at which the intonation of the vowel character lying at the cursor position is altered to the first tone. Concretely, the intonation information 24b of the storage section 24 is rewritten into the first tone, and the intonational symbol expressive of the first tone is displayed as the intonational symbol in the Pinyin input region. Although the details will be explained in connection with the addition/insertion mode process later, the control section 22 additionally stores the requested character to-be-inputted, in the input character information 24c of the storage section 24 in compliance with the input request for the character. In the intonation selection mode process, however, when the request has been made for inputting the identical vowel character, the control section 22 alters the intonation information 24b of the storage section 24 without adding the requested vowel character to-be-inputted, to the input character information 24c of the storage section 24. Further, the control section 22 alters the intonation of the Pinyin stored in the input character information 24c of the storage section 24. Such processing is carried out during the operation explained in conjunction with FIG. 4C.

On condition that the current intonation is the first tone, the routine proceeds to step S23, at which the intonation of the vowel character lying at the cursor position is altered to the second tone. Concretely, the intonation information 24b of the storage section 24 is rewritten into the second tone, and the intonational symbol expressive of the second tone is displayed as the intonational symbol in the Pinyin input region. Further, the intonation of the Pinyin stored in the input character information 24c of the storage section 24 is altered. Such processing is carried out during the operation explained in conjunction with FIG. 4D.

On condition that the current intonation is the second tone, the routine proceeds to step S24, at which the intonation of the vowel character lying at the cursor position is altered to the third tone. Concretely, the intonation information 24b of the storage section 24 is rewritten into the third tone, and the intonational symbol expressive of the third tone is displayed as the intonational symbol in the Pinyin input region. Further, the intonation of the Pinyin stored in the input character information 24c of the storage section 24 is altered. Such processing is carried out during the operation explained in conjunction with FIG. 4E.

On condition that the current intonation is the third tone, the routine proceeds to step S25, at which the intonation of the vowel character lying at the cursor position is altered to the fourth tone. Concretely, the intonation information 24b of the storage section 24 is rewritten into the fourth tone, and the intonational symbol expressive of the fourth tone is displayed as the intonational symbol in the Pinyin input region. Further, the intonation of the Pinyin stored in the input character information 24c of the storage section 24 is altered. Such processing is carried out during the operation explained in conjunction with FIG. 4F.

On condition that the current intonation is the fourth tone, the routine proceeds to step S26, at which the intonation of the vowel character lying at the cursor position is altered to the neutral tone. Concretely, the intonation information 24b of the storage section 24 is rewritten into the neutral tone, and any intonational symbol is not displayed. Further, the intonation of the Pinyin stored in the input character information 24c of the storage section 24 is altered.

At each of steps S22 to S26, the Pinyin stored in the input character information 24c is altered. Therefore, the control section 22 searches the dictionary database section 23 with the new Pinyin as a search key, at step S27. Candidates for a headword are displayed as search results in the search result display region at step S28, and a key input waiting state is established at step S29. Such processing is carried out during the operations explained in conjunction with FIGS. 4B to 4F.

Figure 10:
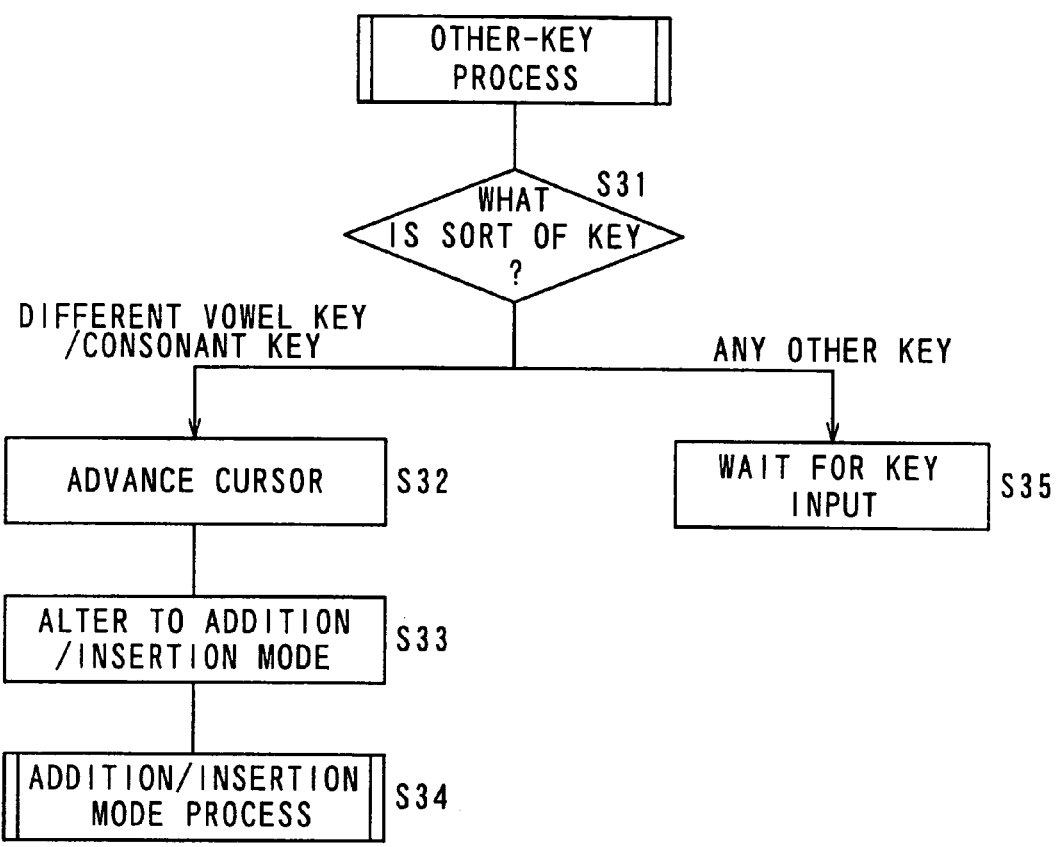
FIG. 10 is a flow chart showing the other-key process at step S19 in FIG. 8.

FIG. 10 is the flow chart showing the other-key process at step S19 in FIG. 8. First, at step S31, the control section 22 judges which of a different vowel key, a consonant key, and any other key the sort of the depressed key corresponds to.

On condition that the depressed key is either of the different vowel key and the consonant key, the cursor is moved rightwards one space at step S32, and it is stored in the operation mode information 24a of the storage information 24 that the last operation is the addition/insertion mode, at step S33. The addition/insertion mode process is executed at step S34. Such processing is carried out during the operation explained in conjunction with FIG. 5D.

On condition that the depressed key is any other key, it is judged that any invalid key has been depressed, and a key input waiting state is established at step S35.

Figure 11:
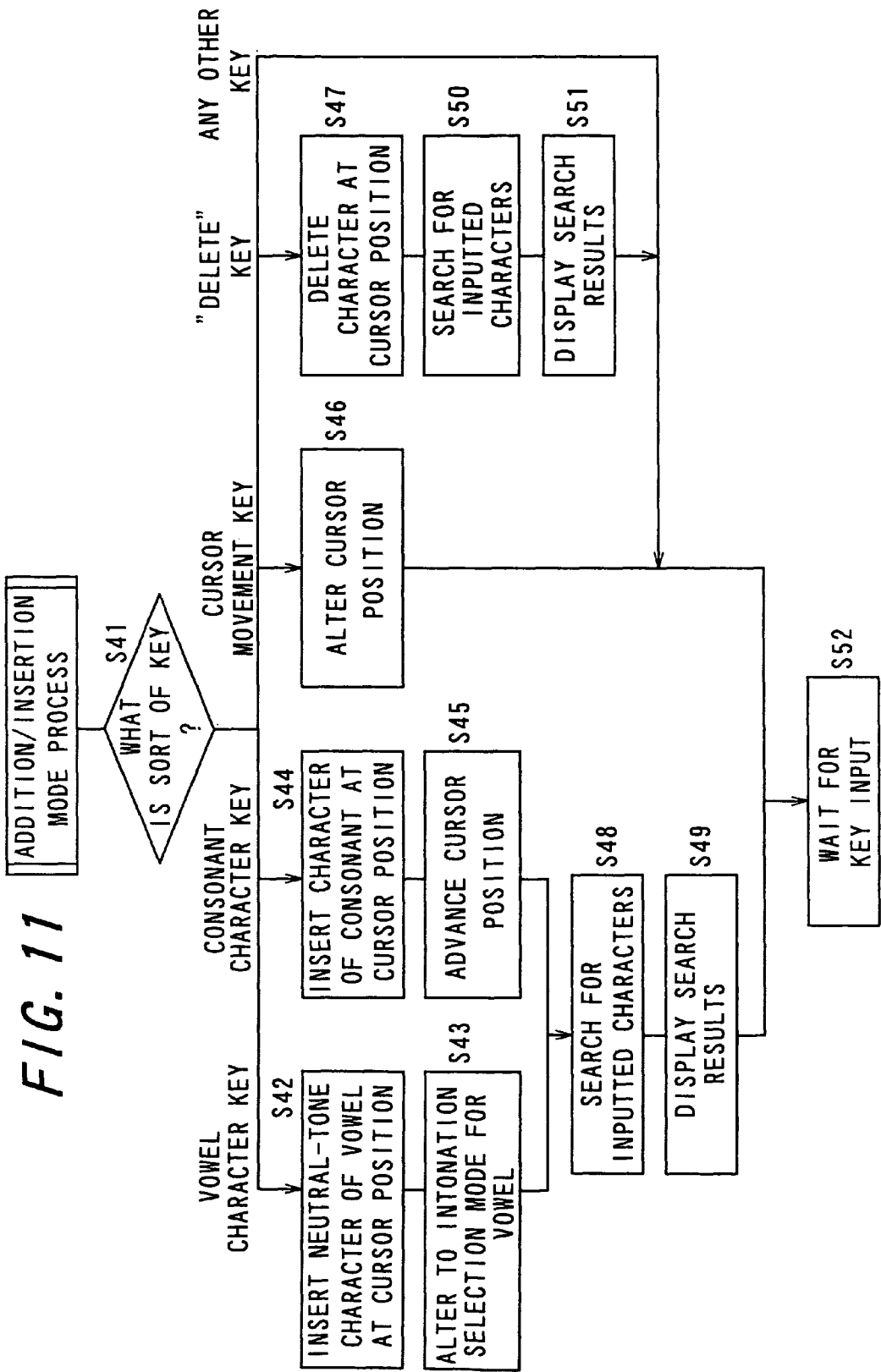
FIG. 11 is a flow chart showing the addition/insertion mode process.

FIG. 11 is the flow chart showing the addition/insertion mode process. First, at step S41, the control section 22 judges which of any vowel key, any consonant key, the cursor key, the "delete" key and any other key the depressed key is.

On condition that the depressed key is any vowel key, the routine proceeds to step S42, at which a requested vowel character (neutral tone) to be inputted is displayed at the cursor position. At step S43, it is stored in the operation mode information 24a of the storage section 24 that the last operation is the intonation selection mode. Besides, the Pinyin stored in the input character information 24c of the storage section 24 is altered by adding the requested vowel character (neutral tone) to-be-inputted. Such processing is carried out during the operation explained in conjunction with FIG. 6D.

On condition that the depressed key is any consonant key, the routine proceeds to step S44, at which a requested consonant character to be inputted is displayed at the cursor position. At step S45, the cursor position is moved rightwards one space. Besides, the Pinyin stored in the input character information 24c of the storage section 24 is altered by adding the requested consonant character to-be-inputted. Such processing is carried out during the operation explained in conjunction with FIG. 5D.

On condition that the depressed key is the cursor key, the routine proceeds to step S46, at which the cursor position is moved in the direction of the depressed cursor key. Thereafter, a key input waiting state is established at step S52. Such processing is carried out during the operation explained in conjunction with FIG. 6B.

At steps S42 and S43, or steps S44 and S45, the Pinyin stored in the input character information 24c is altered. Therefore, the control section 22 searches the dictionary database section 23 with the new Pinyin as a search key, at step S48. Candidates for a headword are displayed as search results in the search result display region at step S49, and a key input waiting state is established at step S52. Such processing is carried out during the operations explained in conjunction with FIGS. 5C and 5D.

On condition that the depressed key is the "delete" key, the routine proceeds to step S47, at which a character at the cursor position is deleted. Since the Pinyin stored in the input character information 24c is altered at step S47, the control section 22 searches the dictionary database section 23 with the new Pinyin as a search key, at step S50. Candidates for a headword are displayed as search results in the search result display region at step S51, and the key input waiting state is established at step S52. Such processing is carried out during the operation explained in conjunction with FIG. 6C.

On condition that the depressed key is any other key, it is judged that any invalid key has been depressed, and the key input waiting state is established at step S52.

Although the intonation inputting for the vowel character has been described in the foregoing embodiment, consonants "m" and "n" have intonations in addition to the vowels "a", "i", "u", "e" and "o" in the Chinese language. Accordingly, processes in the case where the key of a predetermined character, such as "m" key or "n" key, has been depressed may be executed similarly to the processes in the case where the vowel key has been depressed. Incidentally, the character "m" has the tones of the neutral tone, first tone, second tone and fourth tone, while the character "n" has the tones of the neutral tone, second tone, third tone and fourth tone. Accordingly, regarding the character "m", when the "m" key has been successively depressed subject to the current intonation being the second tone, the intonation is altered to the fourth tone, and regarding the character "n", when the "n" key has been successively depressed subject to the current intonation being the neutral tone, the intonation is altered to the second tone.

FIGS. 12A to 12D are diagrams each showing a display screen example in the case of the Pinyin inputting. Now, the case of inputting the intonations of the character "m" will be described with reference to FIGS. 12A to 12D.

Figure 12A:
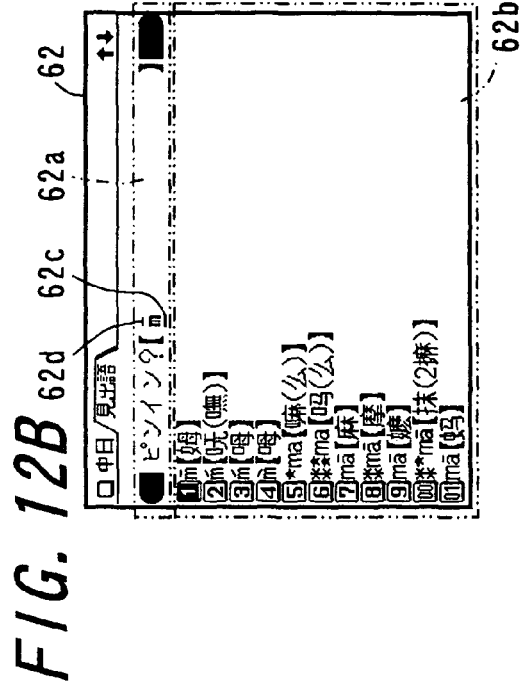
FIGS. 12A to 12D are diagrams each showing a display screen example in the case of Pinyin inputting.

When the "m" key of the character keys 13 is depressed in the state where the Pinyin can be inputted, a character inputting screen 61 shown in FIG. 12A is displayed, and the character "m" as the neutral tone is displayed in a Pinyin input region 61a. A cursor 61c is displayed at the position of the character "m". Here, when the "m" key is subsequently depressed, the character "m" as the first tone is displayed in a Pinyin input region 62a as shown in a character inputting screen 62 in FIG. 12B. In order for the user to understand that displayed is the character "m" of the first tone, an intonational symbol 62d expressive of the first tone is displayed. A cursor 62c is displayed at the position of the character "m". When the "m" key is subsequently depressed, the character "m" as the second tone is displayed in a Pinyin input region 63a as shown in a character inputting screen 63 in FIG. 12C. In order for the user to understand that displayed is the character "m" of the second tone, an intonational symbol 63d expressive of the second tone is displayed. A cursor 63c is displayed at the position of the character "m". When the "m" key is subsequently depressed, the character "m" as the fourth tone is displayed in a Pinyin input region 64a as shown in a character inputting screen 64 in FIG. 12D. In order for the user to understand that displayed is the character "m" of the fourth tone, an intonational symbol 64d expressive of the fourth tone is displayed. A cursor 64c is displayed at the position of the character "m".

Figure 12B:
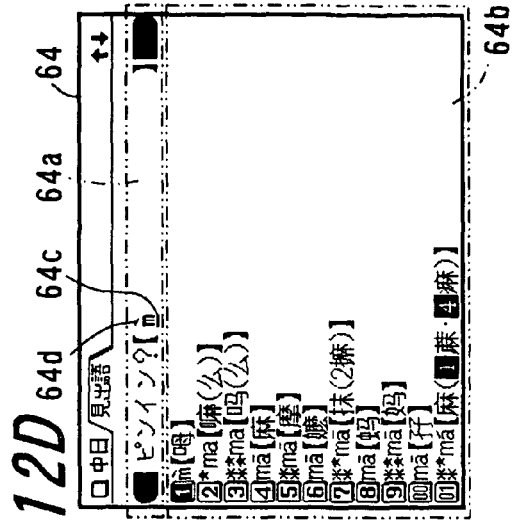
Figure 12C:
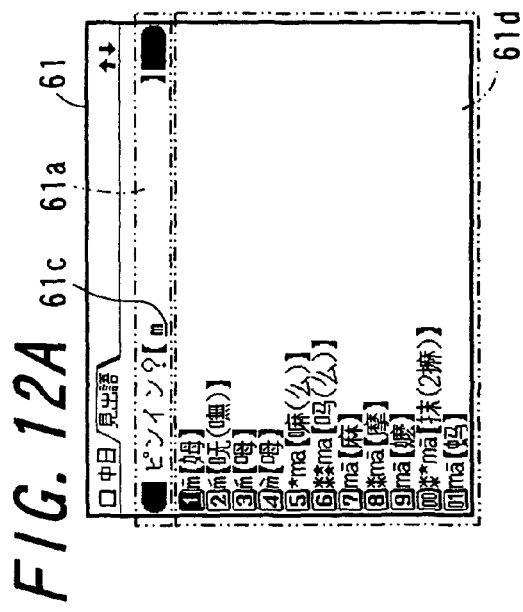
Figure 12D:
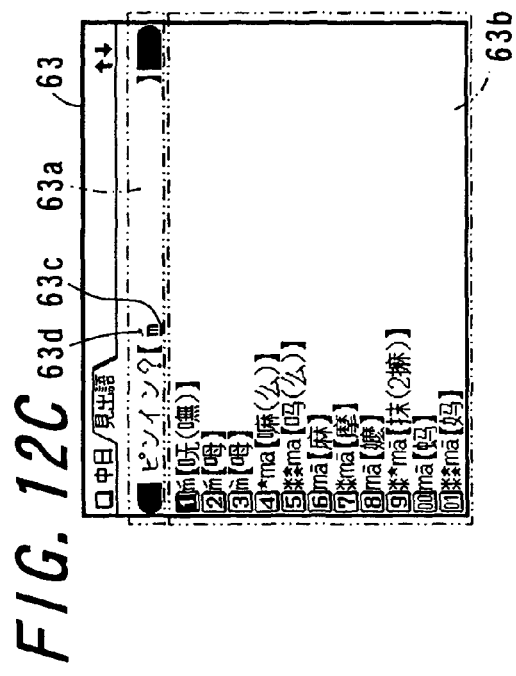

As in the cases described before, search results obtained with a search key being the character inputted to the Pinyin input region are displayed in a search result display region. By way of example, when the character "m" of the neutral tone is inputted to and displayed in the Pinyin input region 61a as shown in FIG. 12A, candidates for the character "m" of the neutral tone are displayed in the forefront in a search result display region 61b. Incidentally, since any candidate matching with the character "m" of the neutral tone is not existent in the dictionary database section 23, candidates are displayed successively from one for the character "m" of the first tone. When the character "m" of the first tone is inputted to and displayed in the Pinyin input region 62a as shown in FIG. 12B, a candidate for the character "m" of the first tone is displayed in the forefront in a search result display region 62b, followed by candidates for the second tone. Incidentally, the displayed candidates are the same as in the case where the character "m" of the neutral tone has been inputted. When the character "m" of the second tone is inputted to and displayed in the Pinyin input region 63a as shown in FIG. 12C, candidates for the character "m" of the second tone are displayed in the forefront in a search result display region 63b, followed by a candidate for the fourth tone. Also, when the character "m" of the fourth tone is inputted to and displayed in the Pinyin input region 64a as shown in FIG. 12D, a candidate for the character "m" of the fourth tone is displayed in the forefront in a search result display region 64b.

FIGS. 13A to 13D are diagrams each showing a display screen example in the case of the Pinyin inputting. Now, the case of inputting the intonations of the character "n" will be described with reference to FIGS. 13A to 13D.

Figure 13A:
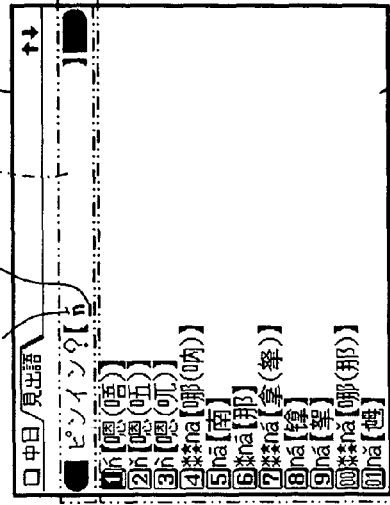
FIGS. 13A to 13D are diagrams each showing a display screen example in the case of Pinyin inputting.

When the "n" key of the character keys 13 is depressed in the state where the Pinyin can be inputted, a character inputting screen 71 shown in FIG. 13A is displayed, and the character "n" as the neutral tone is displayed in a Pinyin input region 71a. A cursor 71c is displayed at the position of the character "n". Here, when the "n" key is subsequently depressed, the character "n" as the second tone is displayed in a Pinyin input region 72a as shown in a character inputting screen 72 in FIG. 13B. In order for the user to understand that displayed is the character "n" of the second tone, an intonational symbol 72d expressive of the second tone is displayed. A cursor 72c is displayed at the position of the character "n". When the "n" key is subsequently depressed, the character "n" as the third tone is displayed in a Pinyin input region 73a as shown in a character inputting screen 73 in FIG. 13C. In order for the user to understand that displayed is the character "n" of the third tone, an intonational symbol 73d expressive of the third tone is displayed. A cursor 73c is displayed at the position of the character "n". When the "n" key is subsequently depressed, the character "n" as the fourth tone is displayed in a Pinyin input region 74a as shown in a character inputting screen 74 in FIG. 13D. In order for the user to understand that displayed is the character "n" of the fourth tone, an intonational symbol 74d expressive of the fourth tone is displayed. A cursor 74c is displayed at the position of the character "n".

Figure 13B:
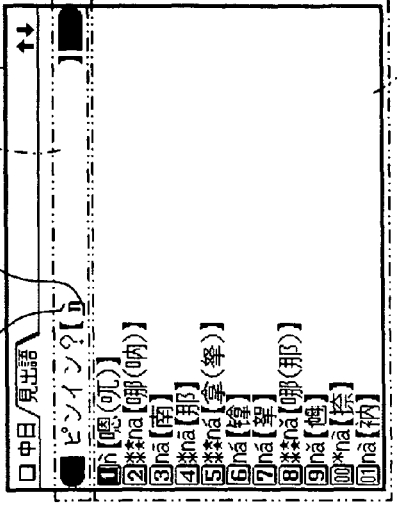
Figure 13C:
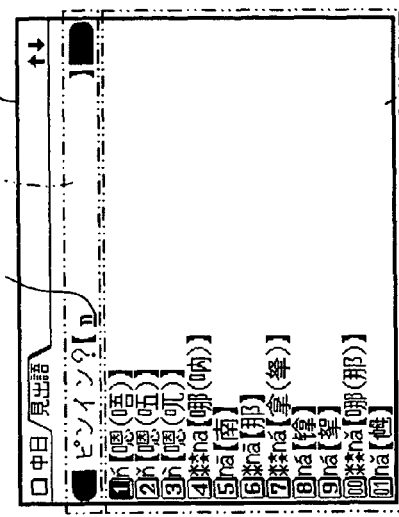
Figure 13D:
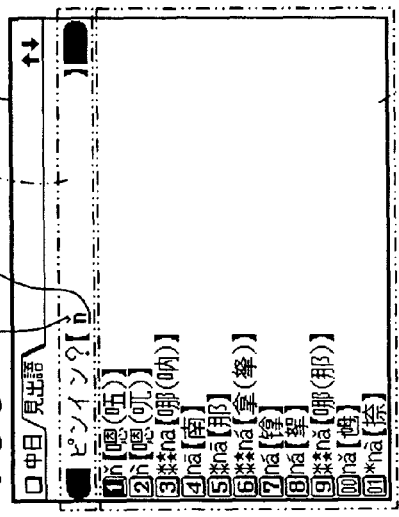

As in the cases described before, search results obtained with a search key being the character inputted to the Pinyin input region are displayed in a search result display region. By way of example, when the character "n" of the neutral tone is inputted to and displayed in the Pinyin input region 71a as shown in FIG. 13A, candidates for the character "n" of the neutral tone are displayed in the forefront in a search result display region 71b. Incidentally, since any candidate matching with the character "n" of the neutral tone is not existent in the dictionary database section 23, candidates are displayed successively from one for the character "n" of the second tone. When the character "n" of the second tone is inputted to and displayed in the Pinyin input region 72a as shown in FIG. 13B, a candidate for the character "n" of the second tone is displayed in the forefront in a search result display region 72b, followed by a candidate for the third tone. Incidentally, the displayed candidates are the same as in the case where the character "n" of the neutral tone has been inputted. When the character "n" of the third tone is inputted to and displayed in the Pinyin input region 73a as shown in FIG. 13C, a candidate for the character "n" of the third tone is displayed in the forefront in a search result display region 73b, followed by a candidate for the fourth tone. Also, when the character "n" of the fourth tone is inputted to and displayed in the Pinyin input region 74a as shown in FIG. 13D, a candidate for the character "n" of the fourth tone is displayed in the forefront in a search result display region 74b.

Incidentally, although the above description has referred to the case where the user makes the input requests by depressing the keys, this aspect is not restrictive, but it is also allowed to employ any input means capable of making character inputting requests, such as input means for making character inputting requests by recognizing handwritten characters based on a touch panel, a mouse, a tablet or the like, or input means for making character inputting requests by recognizing speeches inputted from a microphone or the like voice inputting device.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A character inputting method in a character inputting apparatus for Chinese Pinyin input, the character inputting apparatus having an input section and a control section, comprising:
   upon depressing a key of the input section, the control section detecting an input of a vowel character;
   the control section providing an intonation for the inputted vowel character;
   upon depressing the same key of the input section, the control section detecting an input of a vowel character identical to the inputted vowel character; and
   when the vowel character identical to the inputted vowel character is successively inputted, replacing the intonation with a different intonation for the successively inputted vowel character.

2. The character inputting method of claim 1, wherein the provision of the different intonation is based on an intonation at a last input and a predetermined sequence.

3. The character inputting method of claim 2, wherein the predetermined sequence is in order of a neutral tone, a first tone, a second tone, a third tone, a fourth tone, and the neutral tone.

4. The character inputting method of claim 1, wherein when a different vowel character or a consonant character is inputted in succession to the successive inputs of the identical vowel character,
   an intonation provided at a last one of the successive inputs is validated as an intonation of the inputted vowel character.

5. The character inputting method of claim 1, wherein when movement of a cursor is inputted in succession to the successive inputs of the identical vowel character,
   an intonation provided at a last one of the successive inputs is validated as an intonation of the inputted vowel character.

6. A character search method comprising:
   the control section making a search on the basis of the Pinyin inputted by the character inputting method of claim 1;
   when the intonation of the vowel character has been altered, the control section making a search in accordance with the alteration; and
   the control section outputting the search results.

7. The character search method of claim 6, wherein the search results are outputted by displaying them on a screen, and
   when all the search results cannot be displayed by one frame, the search results are displayed by scrolling the screen.

8. The character inputting method of claim 1, wherein the vowel character includes a, e, i, o, u, m and n.

9. A character inputting method in a character inputting apparatus for Chinese Pinyin input the character inputting apparatus having an input section and a control section, comprising:
   upon depressing a key of the input section, the control section detecting an input of a vowel character;
   the control section providing an intonation for the inputted vowel character;
   upon depressing the same key of the input section the control section detecting an input of a vowel character identical to the inputted vowel character; and
   when the vowel character identical to the inputted vowel character is successively inputted, replacing the intonation with a different intonation for the vowel character inputted at a first one of the successive inputs with regard to second and subsequent inputs.

10. The character inputting method of claim 9, wherein the provision of the different intonation is based on an intonation at a last input and a predetermined sequence.

11. The character inputting method of claim 10, wherein the predetermined sequence is in order of a neutral tone, a first tone, a second tone, a third tone, a fourth tone, and the neutral tone.

12. The character inputting method of claim 9, wherein when a different vowel character or a consonant character is inputted in succession to the successive inputs of the identical vowel character,
    an intonation provided at a last one of the successive inputs is validated as an intonation of the inputted vowel character.

13. The character inputting method of claim 9, wherein when movement of a cursor is inputted in succession to the successive inputs of the identical vowel character,
    an intonation provided at a last one of the successive inputs is validated as an intonation of the inputted vowel character.

14. A character search method comprising:
    the control section making a search on the basis of the Pinyin inputted by the character inputting method of claim 9;
    when the intonation of the vowel character has been altered, the control section making a search in accordance with the alteration; and
    the control section outputting the search results.

15. The character search method of claim 14, wherein the search results are outputted by displaying them on a screen, and
    when all the search results cannot be displayed by one frame, the search results are displayed by scrolling the screen.

16. A character inputting method in a character inputting apparatus for Chinese Pinyin input, the character inputting apparatus having an input section and a control section, comprising:
    upon depressing a key of the input section, the control section detecting an input of a predetermined character;
    the control section providing an intonation for the inputted predetermined character;
    upon depressing the same key of the input section, the control section detecting an input of a vowel character identical to the inputted vowel character; and
    when the character identical to the inputted predetermined character is successively inputted, replacing the intonation with a different intonation of the inputted predetermined character.

17. A character inputting apparatus for Chinese Pinyin input, comprising:
    input means for, upon depressing a key, making an input of a character;
    storage means for storing therein the inputted character; and
    control means for causing when the inputted character is a vowel character, the storage means to store therein the inputted vowel character and its intonation associated therewith,
    wherein, upon depressing the same key such that a vowel character identical to the inputted vowel character is successively inputted by the input means,
    the control means replaces only the intonation associated with the vowel character stored in compliance with a first one of the successive inputs, without causing the storage means to store therein the inputted vowel character anew, in compliance with second and subsequent inputs.

* * * * *